US 12,141,985 B2

(12) United States Patent
Cui et al.

(10) Patent No.: US 12,141,985 B2
(45) Date of Patent: Nov. 12, 2024

(54) WEEDING ROBOT AND METHOD AND APPARATUS FOR PLANNING WEEDING PATH THEREOF, AND MEDIUM

(71) Applicant: NANJING INSTITUTE OF AGRICULTURAL MECHANIZATION, MINISTRY OF AGRICULTURE AND RURAL AFFAIRS, Jiangsu (CN)

(72) Inventors: Longfei Cui, Jiangsu (CN); Xinyu Xue, Jiangsu (CN); Feixiang Le, Jiangsu (CN); Tao Sun, Jiangsu (CN); Songchao Zhang, Jiangsu (CN); Chen Chen, Jiangsu (CN); Yongkui Jin, Jiangsu (CN); Yang Xu, Jiangsu (CN); Zhu Sun, Jiangsu (CN); Suming Ding, Jiangsu (CN); Qingqing Zhou, Jiangsu (CN); Chen Cai, Jiangsu (CN); Wei Gu, Jiangsu (CN); Wei Kong, Jiangsu (CN)

(73) Assignee: NANJING INSTITUTE OF AGRICULTURAL MECHANIZATION, MINISTRY OF AGRICULTURE AND RURAL AFFAIRS, Jiangsu (CN)

( * ) Notice: Subject to any disclaimer, the term of this patent is extended or adjusted under 35 U.S.C. 154(b) by 0 days.

(21) Appl. No.: 18/696,169

(22) PCT Filed: Apr. 21, 2022

(86) PCT No.: PCT/CN2022/088072
§ 371 (c)(1),
(2) Date: Mar. 27, 2024

(87) PCT Pub. No.: WO2023/050783
PCT Pub. Date: Apr. 6, 2023

(65) Prior Publication Data
US 2024/0265547 A1      Aug. 8, 2024

(30) Foreign Application Priority Data

Sep. 29, 2021   (CN) .......................... 202111147412.4

(51) Int. Cl.
*G06T 7/11*       (2017.01)
*A01B 39/18*      (2006.01)
(Continued)

(52) U.S. Cl.
CPC ............... *G06T 7/11* (2017.01); *A01B 39/18* (2013.01); *A01B 69/008* (2013.01); *G06T 7/521* (2017.01);
(Continued)

(58) Field of Classification Search
CPC . G06T 7/11; G06T 7/521; G06T 2207/20081; G06T 2207/20084;
(Continued)

(56) References Cited

U.S. PATENT DOCUMENTS 10,455,826 B2 * 10/2019 Palomares ............. A01B 39/18
11,237,563 B2 *  2/2022 Javault ................... A01D 46/30
(Continued)

FOREIGN PATENT DOCUMENTS

CA    3150720 A1 *  3/2021   ............ A01B 39/18
CN    106951836 A     7/2017
(Continued)

OTHER PUBLICATIONS

Florance et al, May 2021, "Neural Network based weeding robot for crop and weed discrimination" (pp. 1-7) (Year: 2021).*
(Continued)

*Primary Examiner* — Manav Seth
(74) *Attorney, Agent, or Firm* — Dinsmore & Shohl LLP (57) ABSTRACT

A weeding robot and a method and apparatus for planning a weeding path for the weeding robot and a medium are
(Continued)

provided. The method for planning a weeding path for the weeding robot includes the following steps: acquiring an image segmentation model based on neural network model training, where the image segmentation model is configured to identify and segment a weed target feature, a soil target feature and a crop target feature; and based on the weed target feature, acquiring the weed target feature by intra-camera tracking, and acquiring the weed target feature by inter-camera tracking, and planning a weeding path for a weeding robotic arm of the weeding robot, to enable the weeding robotic arm to weed according to the weeding path.

8 Claims, 6 Drawing Sheets

(51) Int. Cl.
| | | |
|---|---|---|
| *A01B 69/04* | (2006.01) | |
| *G06T 7/521* | (2017.01) | |
| *G06V 10/764* | (2022.01) | |
| *G06V 20/10* | (2022.01) | |
| *G06V 20/70* | (2022.01) | |

(52) U.S. Cl.
CPC .......... *G06V 10/764* (2022.01); *G06V 20/188* (2022.01); *G06V 20/70* (2022.01); *G06T 2207/20081* (2013.01); *G06T 2207/20084* (2013.01)

(58) Field of Classification Search
CPC .... G06V 20/70; G06V 20/188; G06V 10/764; A01B 39/18; A01B 69/008
See application file for complete search history.

(56) References Cited

U.S. PATENT DOCUMENTS

| | | | |
|---|---|---|---|
| 11,304,355 B2 * | 4/2022 | Noivirt-Brik | B64D 1/16 |
| 11,907,341 B2 * | 2/2024 | Kuramoto | G06N 20/00 |
| 11,963,473 B2 * | 4/2024 | Sibley | A01C 21/005 |
| 2020/0011019 A1 | 1/2020 | Serrat et al. | |
| 2021/0105995 A1 * | 4/2021 | Palomares | A01B 39/18 |
| 2022/0117218 A1 * | 4/2022 | Sibley | G06V 20/188 |
| 2023/0189787 A1 * | 6/2023 | Palomares | A01D 34/008 172/2 |
| 2024/0180142 A1 * | 6/2024 | Wurden | G05D 1/0212 |

FOREIGN PATENT DOCUMENTS

| | | | |
|---|---|---|---|
| CN | 109614973 A | 4/2019 | |
| CN | 209643363 U | 11/2019 | |
| CN | 111340141 A | 6/2020 | |
| CN | 111837593 A | 10/2020 | |
| CN | 112380926 A | 2/2021 | |
| CN | 113597874 A | 11/2021 | |
| EP | 3811748 A1 * | 4/2021 | ............ A01B 39/18 |
| EP | 3790383 B1 * | 11/2023 | .......... A01B 79/005 |
| WO | 2009153304 A1 | 12/2009 | |
| WO | WO-2019215582 A1 * | 11/2019 | .......... A01B 79/005 |
| WO | WO-2020036942 A1 * | 2/2020 | ............ A01B 39/18 |

OTHER PUBLICATIONS

Zhang et al., 2017, "A visual navigation algorithm for paddy field weeding robot based on image understanding" (pp. 66-78). (Year: 2017).*
International Search Report of Corresponding International Application No. PCT/CN2022/088072 Mailed Jun. 24, 2022, 5 pages.
First Office Action of Corresponding Chinese Patent Application No. 202111147412.4, 4 pages.
Examination Report No. 1 of Corresponding Australian Patent Application No. 2022256171 dated Nov. 13, 2023, 5 pages.
Pretto, Alberto, et al., "Building an Aerial-Ground Robotics System for Precision Farming: An Adaptable Solution", IEEE Robotics & Automation Magazine, 2020, DOI: 10.1109/MRA.2020.3012492, 13 pages.

* cited by examiner

| Acquire an image segmentation model based on neural network model training, where the image segmentation model is configured to identify and segment a weed target feature, a soil target feature and a crop target feature | S101 |

| Based on the weed target feature, acquire the weed target feature by intra-camera tracking, and acquiring the weed target feature by inter-camera tracking, and plan a weeding path for a weeding robotic arm of the weeding robot, to enable the weeding robotic arm to weed according to the weeding path | S102 |

WEEDING ROBOT AND METHOD AND APPARATUS FOR PLANNING WEEDING PATH THEREOF, AND MEDIUM

CROSS-REFERENCE TO RELATED APPLICATIONS

This application is a U.S. National Stage application filed under 35 U.S.C. § 371 based on International Patent Application No. PCT/CN2022/088072, filed on Apr. 21, 2022, which claims priority to Chinese Patent Application No. 202111147412.4 filed with the Chinese Intellectual Property Administration on Sep. 29, 2021, the disclosures of which are incorporated herein by reference in their respective entireties.

FIELD

The present application relates to the technical field of weeding robots and, for example, to a weeding robot and a method and apparatus for planning a weeding path for the weeding robot and a medium.

BACKGROUND

Under the premise of advocating environmental protection, greatly increasing the yield of crops will be the main task of green and sustainable agriculture. Most organic farms are not allowed to use chemical synthetic agricultural pesticides and herbicides, and artificial weeding is still used in field management, but the cost of artificial weeding is very high. There are two major issues faced by field weeding: first, the number of people engaged in agricultural labor continues to decrease, and the labor cost for weeding continues to rise; second, the awareness of environmental protection continues to raise, and the degree of restriction on the amount of use of herbicides in many places continues to increase. The emergence of artificial intelligence technology and robot technology provides an effective way to address the above issues. Robotic systems for physical weeding can successfully remove weeds between rows of plants. However, when a weed is located close to a stem of a crop, removing the weed near the stem of the plant is a very challenging task.

To accurately locate a weed, the weed should be distinguished from a valuable crop first. Vision-based classification methods have been approved to be effective in this field. However, this visual classification method is generally implemented by using a complex convolutional neural network (CNN), and the CNN induces a long uncertain time delay, which greatly reduces the precision of weeding and cannot be applied to real agricultural scenarios, relevant researches are all in the experimental stage. Further, traditional single-camera weed tracking systems are generally unable to adapt to long weed detection delays due to their limited field of view. Changes in the camera s perspective and viewpoint during robot walking may cause significant changes in the appearance of objects, especially for those tall weeds, changes of their images are large, therefore, with the conventional method, it is prone to losing targets in tracking and accidentally injuring crops.

SUMMARY

A weeding robot, a method for planning a weeding path for the weeding robot, an apparatus for planning a weeding path for the weeding robot and a medium are provided according to the present application. Based on intra-camera tracking and inter-camera tracking, the location of weeds can be reliably recorded and traced to alleviate the adverse effect caused by image processing delays and improve the precision of weeding.

A method for planning a weeding path for a weeding robot is provided according to the present application, which includes:
acquiring an image segmentation model based on neural network model training, where the image segmentation model is configured to identify and segment a weed target feature, a soil target feature and a crop target feature; and
based on the weed target feature, acquiring the weed target feature by intra-camera tracking, and acquiring the weed target feature by inter-camera tracking, planning a weeding path for a weeding robotic arm of the weeding robot, to enable the weeding robotic arm to weed according to the weeding path.

An apparatus for planning a weeding path for a weeding robot is proposed in the present application, which is applied to the method for planning a weeding path for a weeding robot as described above. The apparatus includes: a model acquisition module and a path planning module.

The model acquisition module is configured to acquire an image segmentation model based on neural network model training, where the image segmentation model is configured to identify and segment a weed target feature, a soil target feature and a crop target feature.

The path planning module is configured to acquire the weed target feature by means of intra-camera tracking and acquire the weed target feature by means of inter-camera tracking based on the weed target feature, so as to plan a weeding path for a weeding robotic arm of the weeding robot, to enable the weeding robotic arm to perform weeding according to the weeding path.

A weeding robot is further proposed in the present application, which includes the apparatus for planning a weeding path for the weeding robot described above; the weeding robot further includes: one or more processors; a data storage apparatus, configured to store one or more programs; and store images captured by each camera, image templates and corresponding coordinate information in the 3D scene graph.

The one or more programs, when being executed by the one or more processors, cause the one or more processors to implement the method for planning a weeding path for a weeding robot as described above.

A non-transitory computer-readable storage medium on which a computer program is stored is further proposed in the present application, the computer program, when being executed by a processor, implements the method for planning an automatic weeding path for a weeding robot as described above.

DETAILED DESCRIPTION

The present application is described hereinafter with reference to the drawings and embodiments. The embodiments described herein are merely intended to explain the present application. For the convenience of description, only the parts related to the present application are shown in the drawings.

Feeding the growing population and protecting the environment are two major challenges for future agricultural development. Precision agriculture, also known as smart agriculture, which has been proposed and implemented in many countries around the world, will be helpful in addressing these two challenges. Weeds are plants that compete with desired cash crops and reduce productivity. They compete with crops for water, nutrients, space and sunlight, resulting in reduced crop yield and quality. In practical, crop cultivation practices rely heavily on the uniform use of herbicides to control weeds. Within this scope, the development of agricultural robotic systems is critical to the realization of precision agriculture. In the related art, a visual classification method is generally used to track weeds. The visual classification method is generally implemented by using a complex convolutional neural network, and the convolutional neural network will induce a long uncertain time delay, so that in weeding, when the weeding camera captures images and finishes image processing, the robot may have passed the position of the weeding target, however, the weeding robotic arm has not moved to the designated position, thus the precision of weeding is heavily reduced.

In addition, the target identification algorithm in the related art only identifies weeds and does not track the changes in the position of weeds. Further, conventional single-camera target tracking generally adopts motion-based contour trackers for target tracking; single-camera weed tracking systems generally cannot be adapted to long weed detection (image segmentation) delays and long robotic arm movement delays due to their limited field of view. Moreover, when the robot walks, the chassis is bumped due to the undulation of the ground, and the angle of view and viewpoint of the camera are therefore changed, which, in the conventional method, may cause significant changes (distortion, blur) in the appearance of objects, especially for those tall weeds, changes of their images are large, therefore, with the conventional method, it is prone to losing targets in tracking and accidentally injuring crops.

In order to address the above-described technical issues, it is proposed according to an embodiment of the present application a method for planning a weeding path for a weeding robot, the method includes acquiring an image segmentation model based on neural network model training, where the image segmentation model is configured to identify and segment a weed target feature, a soil target feature and a crop target feature; based on the weed target feature, acquiring the weed target feature by intra-camera tracking, and acquiring the weed target feature by inter-camera tracking, and planning a weeding path for a weeding robotic arm of the weeding robot, to enable the weeding robotic arm to weed according to the weeding path, so that the weeding robotic arm can move to the designated weeding position in advance, which alleviates the adverse effects caused by image processing delay and improves the precision of weeding.

Figure 1:
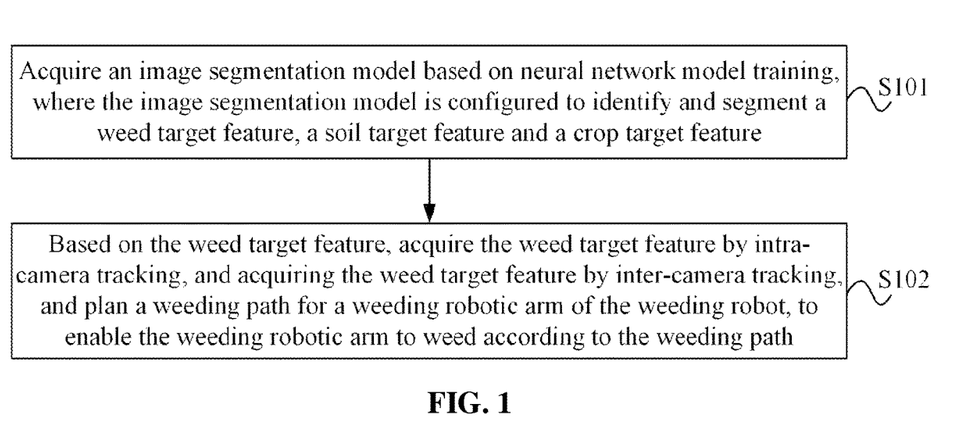
FIG. 1 is a flowchart of a method for planning a weeding path for a weeding robot according to an embodiment of the present application.

The method for planning a weeding path for a weeding robot proposed in the embodiment of the present application is introduced hereinafter. FIG. 1 is a flowchart of a method for planning a weeding path for a weeding robot according to an embodiment of the present application. As shown in FIG. 1, the method for planning the weeding path for the weeding robot includes: S101 and S102.

S101 may include acquiring an image segmentation model based on neural network model training, where the image segmentation model is configured to identify and segment a weed target feature, a soil target feature and a crop target feature.

According to an embodiment of the present application, the acquiring an image segmentation model based on neural network model training in S101 may include: capturing multiple original images through a camera under different parameters, where the parameters include growth stages of crops, light intensity, temperature, humidity, soil type and capturing time; classifying the multiple original images according to the growth stages of the crops, and labeling the crops, weeds, and soil in each original image to form labeled images; dividing the original images and labeled images of each growth stage of the crops into a training set, a validation set, and a test set; defining a deep neural network architecture, based on the training set, validation set and test set of each growth stage of the crops, setting training parameters, and invoking an optimization algorithm to train the deep neural network architecture, to obtain a model weight file after training; and acquiring an image segmentation model of each growth stage of the crops based on the model weight file.

The growth stages of crops include a seedling stage, a growing stage and a maturing stage, that is to say, under corresponding light intensity, temperature, humidity, soil type and capturing time, multiple original images of weeds, soil and crops in the seedling stage, multiple original images of weeds, soil and crops in the growing stage, multiple original images of weeds, soil and crops in the maturity stage can be acquired respectively.

Taking the original images of weeds, soil and crops in the seedling stage as an example, multiple original images of weeds, soil and crops in the seedling stage are classified and labeled to form labeled images. For example, a soil label is 0, a crop label is 1, and a weed label is 2, where the labeling process can be performed manually by using labeling software to label the original images, segment the crops, weeds and soil in each picture, to generate labeled images, that is, channel grayscale images, the grayscale values of the channel grayscale images represent their classification categories. Then, the multiple seedling stage labeled images and multiple seedling stage original images are divided into a training set, validation set and test set, and a neural network architecture is defined, and the neural network architecture is trained by deep learning method; and an image segmentation model for the crops in the seedling stage is obtained. In this embodiment, three deep learning architectures, fully convolutional networks (FCN), U-NET, and Deeplab v3+, are used in combination to train the image segmentation model to obtain the image segmentation model for the crops in the seedling stage. Configuration parameters for the three deep learning architectures include learning rate, learning rate decay, processing batch size, and the number of graphics processing units (GPUs) to be used. In the training process, multi-GPU training is started; the accuracy and Jaccard index are regularly reported, and the model weight file with the best performance in the validation set is stored; and the network architecture with the highest image segmentation precision for the crops in the seedling stage is selected. In practical operation, an edge computer with a GPU device can be installed on the weeding robot, the edge computer is installed with an Ubuntu system and a robot operating system (ROS) development environment, to freshly create an ROS node for real-time semantic segmentation of images, thereby, the model on the edge computer can run online to implement real-time segmentation of crops and weeds.

For the acquisition of the image segmentation model for the crops in the growing stage and the acquisition of the image segmentation model for the crops in the maturing stage, please refer to the acquisition process of the image segmentation model for the crops in the seedling stage, which are not repeated here.

S102 may include, based on the weed target feature, acquiring the weed target feature by intra-camera tracking and acquiring the weed target feature by inter-camera tracking, and planning a weeding path for a weeding robotic arm of the weeding robot to enable the weeding robotic arm to weed according to the weeding path.

The intra-camera tracking means that a camera itself identifies weeds, soil and crops in the images captured by the camera. The inter-camera tracking means that an initial camera identifies weeds, soil and crops in the captured images based on the image segmentation models, and a next camera tracks the identification results of the previous camera to identify weeds, soil and crops in the images captured by itself, and finally plan the weeding path for the weeding robotic arm of the weeding robot according to the identified weed feature. Since the next camera tracks the identification results of the previous camera, the weeding path for the weeding robotic arm can be predicted in advance, so as to allow the weeding robotic arm of the weeding robot to swing to the weeding position accurately, which alleviates the adverse effect of image processing delay and improves the precision of weeding. The weed target feature in this embodiment mainly includes external dimensions and position information of weeds.

S102 is described hereinafter with embodiments.

According to an embodiment of the present application, a first camera, . . . , an i-th camera, . . . , an N-th camera are arranged sequentially at intervals in an opposite direction of a heading direction of the weeding robot, and the first camera to the N-th camera move with a movement of the weeding robot; the based on the weed target feature, acquiring the weed target feature by intra-camera tracking and acquiring the weed target feature by inter-camera tracking, and planning a weeding path for a weeding robotic arm of the weeding robot includes: acquiring a first image captured by the first camera, invoking the image segmentation model to identify and segment the first image, to generate a first weed target feature and a weed label of the first weed target feature; when the i-th camera is a second camera, acquiring an i-th image captured by the i-th camera, extracting target feature in the i-th image according to a density-based spatial clustering method, and matching the target feature in the i-th image with an (i−1)-th weed target feature, to obtain an i-th weed target feature corresponding to the (i−1)-th weed target feature and a weed label of the i-th weed target feature; according to the i-th weed target feature and the weed label of the i-th weed target feature, planning a weeding path for the weeding robotic arm of the weeding robot; when the i-th camera is a third camera to the N-th camera in sequence, extracting target feature in the i-th image according to the density-based spatial clustering method, matching the target feature in the i-th image with an (i−1)-th weed target feature to obtain an i-th weed target feature corresponding to the (i−1)-th weed target feature, and a weed label of the i-th weed target feature; according to the i-th weed target feature and the weed label of the i-th weed target feature, correcting the weeding path for the weeding robotic arm of the weeding robot; where, N≥2, 1<i≤N, i and N are both positive integers; the time for the N-th camera to follow the weeding robot to move to an original position of the first camera and the sum of time of image processing of the first camera to the N-th camera are greater than or equal to the time for the weeding robotic arm of the weeding robot to swing to the position of a weed corresponding to the first weed target feature.

Figure 2:
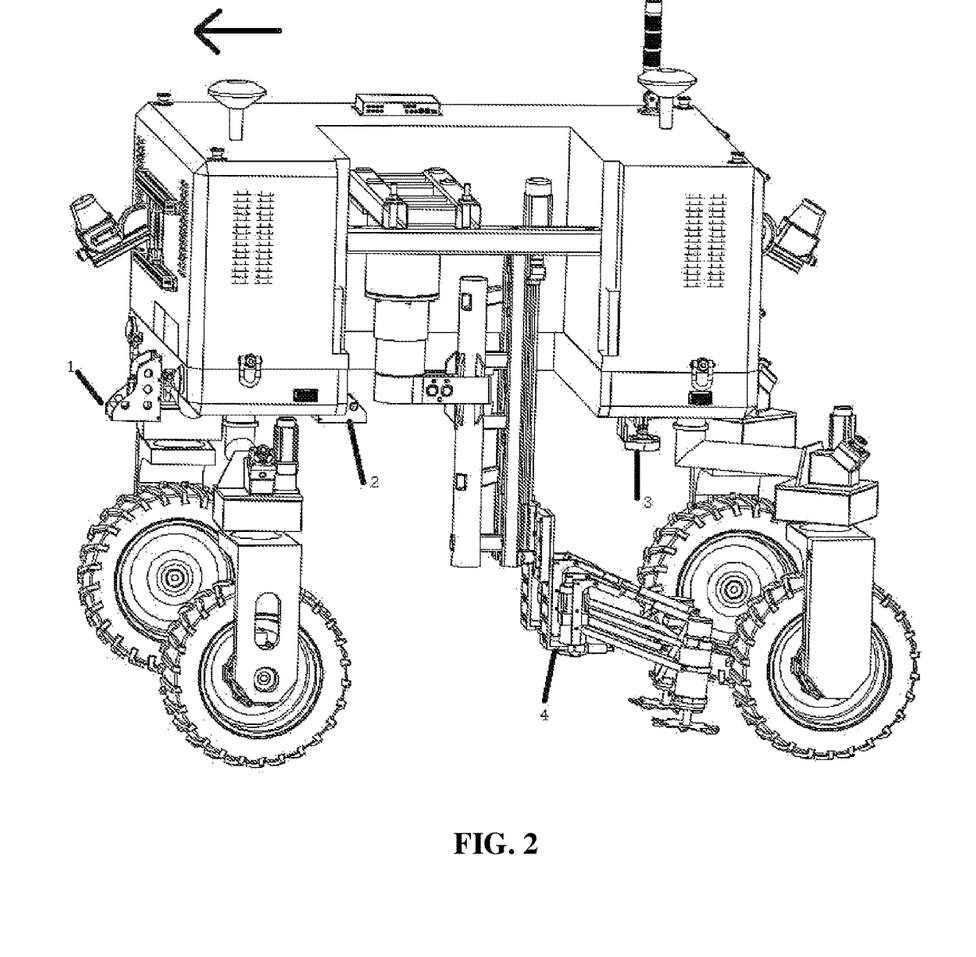
FIG. 2 is a schematic structural view of a weeding robot according to an embodiment of the present application.

Taking N being 3 as an example, as shown in FIG. 2 to FIG. 5, the left arrow in FIG. 2 indicates a heading direction of the robot, S102 includes acquiring a first image captured by the first camera 1, invoking the image segmentation model to identify and segment the first image (where a lightweight target detector can be used to identify the type and growth stage of the crops, so as to invoke a suitable image segmentation model), to generate a first weed target feature and a weed label of the first weed target feature, controlling the weeding robotic arm 4 of the weeding robot to start, and then acquiring a second image captured by the second camera 2, extracting target feature in the second image according to the density-based spatial clustering method, and matching the target feature in the second image with the first weed target feature, to obtain a second weed target feature corresponding to the first weed target feature and a weed label of the second weed target feature; according to the second weed target feature and the weed label of the second weed target feature, planning a weeding path for the weeding robotic arm of the weeding robot; at this time, the weeding robotic arm 4 has generally reached a preset position, and then acquiring a third image captured by a third camera 3, extracting target feature in the third image according to the density-based spatial clustering method, matching the target feature in the third image with the second weed target feature to obtain a third weed target feature corresponding to the second weed target feature, and a weed label of the third weed target feature; according to the third weed target feature and the weed label of the third weed target feature, correcting the weeding path for the weeding robotic arm of the weeding robot; thus, when the third camera 3 moves to the position of the first camera 1, the weeding robotic arm 4 of the weeding robot has been prepared in advance, and simply needs to be fine-regulated to weed, which avoids the following problem: the time delay issue caused by only one camera capturing images and identifying through the model which makes the robot walks past the location of the weed then the robotic arm reaches the preset position, causing accidental injury to crops.

The weed target feature can be one or a combination of several of contour, color, size, and coordinates of weeds. The time for the N-th camera to follow the weeding robot to move to the original position of the first camera (that is, is related to the walking speed of the weeding robot), and the sum of the time for the first camera to the N-th camera to process images, are greater than or equal to the time for the weeding robotic arm of the weeding robot to swing to the position of the weed corresponding to the first weed target feature. Then, the weeding robotic arm can be accurately swung to a preset position to achieve more precise weeding.

The first camera 1 to the third camera 3 can also be cameras installed on a drone, not limited to being installed on the weeding robot, and image information can be transmitted between the drone and the robot through wireless communication.

In the foregoing embodiment, the first camera may be a red-green-blue near-infrared (RGB+NIR) spectral camera, the second camera may be a conventional RGB camera, and the third camera may be a conventional RGB camera.

According to an embodiment of the present application, a first camera, . . . , a j-th camera, . . . , an N-th camera are arranged sequentially at intervals in an opposite direction of the heading direction of the weeding robot, and the first camera to the N-th camera move with a movement of the weeding robot; the based on the weed target feature, acquiring the weed target feature by intra-camera tracking and acquiring the weed target feature by inter-camera tracking, and planning a weeding path for a weeding robotic arm of the weeding robot to enable the robotic arm to weed according to the weeding path, includes: acquiring a first image captured by the first camera, invoking the image segmentation model to identify and segment the first image, to generate a first weed target feature and a weed label of the first weed target feature; when the j-th camera is a second camera, acquiring a j-th image captured by the j-th camera, and reconstructing, based on a 3D (three dimensional) reconstruction method of simultaneous localization and mapping (SLAM), a 3D scene graph of weeds by the j-th camera according to the j-th image, where the j-th camera is a sensor having a 3D scene perception capability, such as any one of a binocular camera, depth camera or multi-line lidar sensor, and when the j-th camera is a binocular camera, the 3D reconstruction method can be the visual odometry method, and when the j-th camera is a lidar sensor, the 3D reconstruction method can be a lidar 3D scene reconstruction method; matching a (j−1)-th weed target feature and a weed label of the (j−1)-th weed target feature with a weed in the 3D scene graph, and separating a 3D graph of the weed from a matching result, and extracting position coordinates of a main stem of a crop, to form an image template according to the 3D graph and the position coordinates; acquiring a (j+1)-th image captured by a (j+1)-th camera, extracting target feature in the (j+1)-th image according to the density-based spatial clustering method, and matching the target feature in the (j+1)-th image with the image template, to obtain an (j+1)-th weed target feature and a weed label of the (j+1)-th weed target feature; planning a weeding path for the weeding robotic arm of the weeding robot according to the (j+1)-th weed target feature and the weed label of the (j+1)-th weed target feature; when the j-th camera is a third camera to the (N−1)-th camera in sequence, acquiring a j-th image captured by the j-th camera, and reconstructing a 3D scene graph of weeds through the j-th camera according to the j-th image, where the j-th camera is one of a binocular camera, a depth camera or a multi-line lidar sensor; matching a (j−1)-th weed target feature and a weed label of the (j−1)-th weed target feature with weeds in the 3D scene graph, separating a 3D graph of a weed from a matching result, and extracting position coordinates of a main stem of a crop to form an image template according to the 3D graph and the position coordinates; acquiring a (j+1)-th image captured by a (j+1)-th camera, extracting target feature in the (j+1)-th image according to the density-based spatial clustering method, matching the target feature in the (j+1)-th image with the image template to obtain an (j+1)-th weed target feature and a weed label of the (j+1)-th weed target feature; according to the (j+1)-th weed target feature and the weed label of the (j+1)-th weed target feature, correcting the weeding path for the weeding robotic arm of the weeding robot; when the j-th camera is the N-th camera, acquiring a j-th image captured by the N-th camera, extracting target feature in the j-th image according to the density-based spatial clustering method, and matching the target feature in the j-th image with a (j−1)-th weed target feature, to obtain a j-th weed target feature corresponding to the (j−1)-th weed target feature and a weed label of the j-th weed target feature; correcting the weeding path for the weeding robotic arm of the weeding robot according to the j-th weed target feature and the weed label of the j-th weed target feature; where, N≥2, 1<i≤N, where j and N are both positive integers; the time for the N-th camera to follow the weeding robot to move to an original position of the first camera and the sum of time of image processing of the first camera to the N-th camera are greater than or equal to the time for the weeding robotic arm of the weeding robot to swing to the position of a weed corresponding to the first weed target feature.

In another embodiment, referring to FIG. 2 and still taking N being 3 as an example, a 3D scene graph of soil, weeds and crops can be reconstructed according to the images captured by the second camera 2, and then the following steps are performed.

(1) After the 3D scene graph is established, the crops/weeds in the segmentation results of the first camera image are matched with the crops/weeds in the 3D scene graph of the second camera, and the center and contour boundary of a weed are converted into the picture of the current frame, to generate an image template for target tracking, to update the position of the crop/weed in real time, and record its label, this step realizes the target tracking of the crops/weeds within the field of view of the second camera.

(2) When the crops and weeds in the field of view move out of the sight of the second camera, an edge computer runs a lightweight object detection model (the object detection model can be YOLO Nano), its classification results are verified again according to the labels accumulated in the images to prevent misclassification and damage to crops.

(3) The third camera is arranged above the weeding apparatus, which is installed perpendicular to the ground to face downward. Once the third camera finds a fresh weed/crop object moving into its field of view, it performs target feature extraction on the weed/crop, and matches the extracted target feature with the weed/crop feature in the previous image template to determine the label of the object. The computer is controlled to start a fill light through a digital switch, and the computer is controlled to run a weed tracking algorithm, and track the position change of the weeds in the field of view of the camera.

(4) After repeated intra-camera tracking and inter-camera tracking with multi-target tracking algorithm, when the weed finally approaches an end actuator, the relative position of the actuator with respect to the weed and the movement speed of the robot chassis are tracked, and the algorithm is controlled to predict a trigger time and the position of the weeding apparatus is adjusted for precise weeding.

(5) A phenotype detection module is installed on an upper part of a cutter motor, and the phenotype detection module is composed of a lidar, an inertial measurement unit (IMU), and a camera. A target detection algorithm is run on another computer II of the weeding robot to detect the stem of the crop in real time, and the multi-line lidar estimates the distance between the weeding blade and the main stem of the crop in real time, so as to avoid injuring the main stem of the crop.

In the foregoing embodiments, the first camera may be an RGB+NIR camera, the second camera may be a binocular camera with an IMU, and the third camera may be a conventional RGB camera. The distance between the camera and the ground is 80 cm, and the ground resolution is about 3 pixels/cm. Before the system works in the field, all cameras are calibrated and their images are corrected to compensate for the distortion caused by the lens. To prevent the cameras from being adversely affected by changes in sunlight intensity, a fill light can be installed next to each camera.

Figure 3:
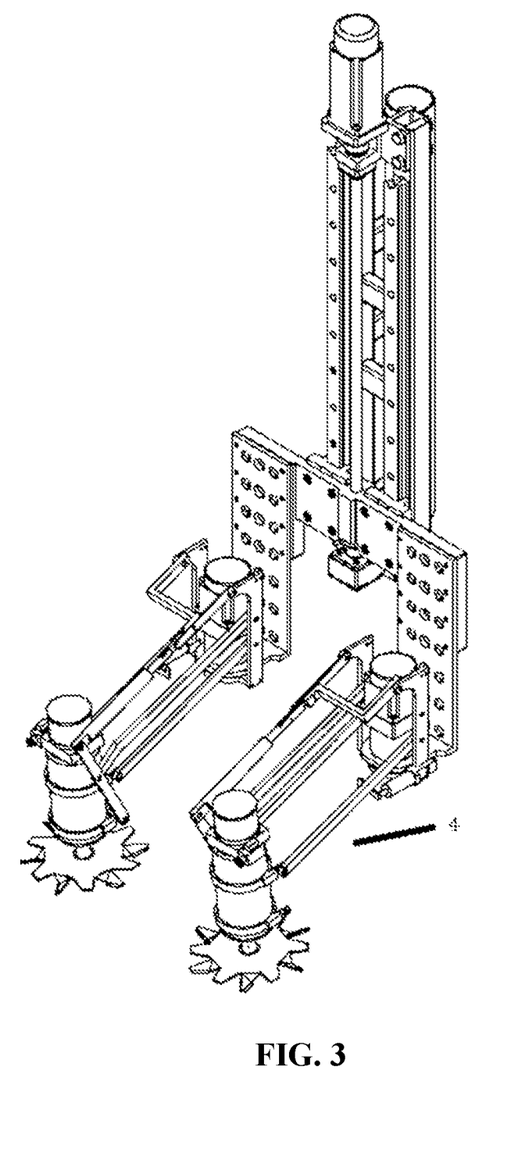
FIG. 3 is a schematic structural view of a weeding robotic arm of a weeding robot according to an embodiment of the present application.
Figure 4:
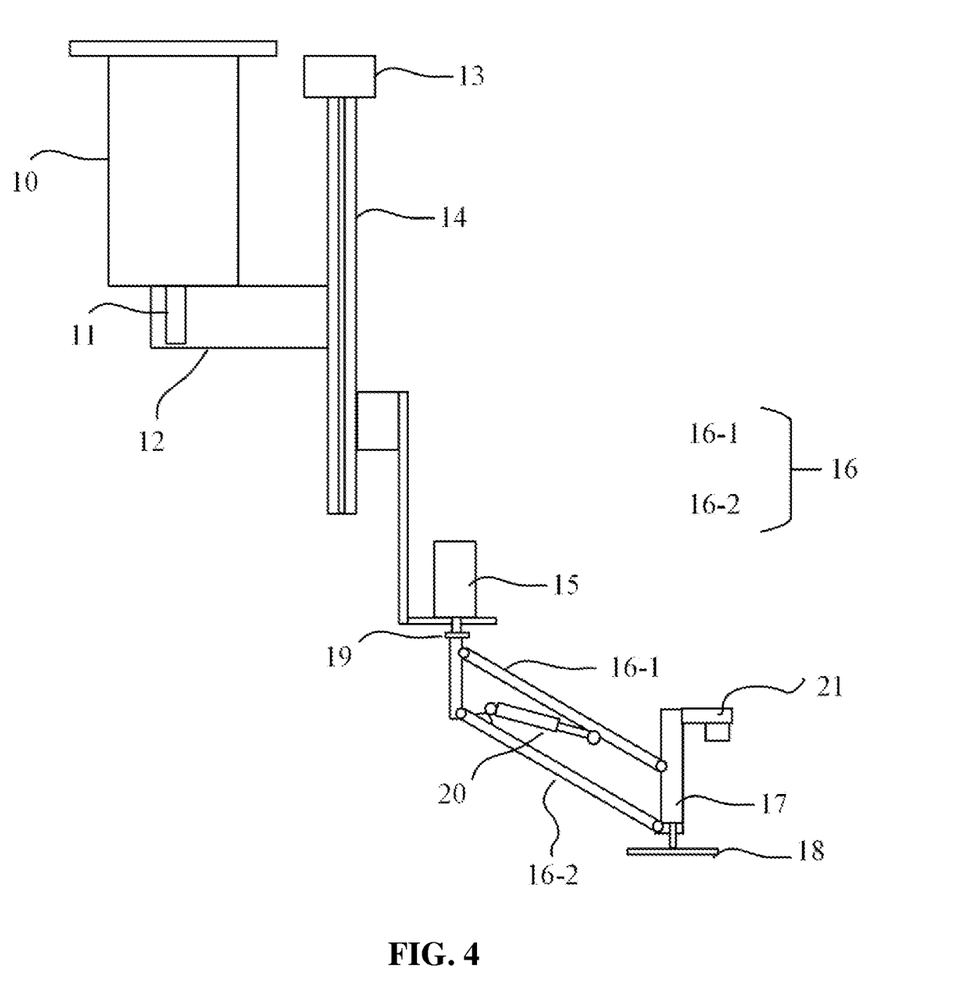
FIG. 4 is a side view of a weeding robotic arm of a weeding robot according to an embodiment of the present application.

On the basis of the foregoing two embodiments, the weeding robotic arm performs actions according to the planned weeding path. As shown in FIG. 3 and FIG. 4, the weeding robotic arm 4 of the weeding robot includes a first motor 10 and a second motor 13, a third motor 15, a fourth motor 17, a first rotary joint 11, a second rotary joint 19, a big arm 12, a small arm 16, a screw rod and guide rail 14, a cutter 18, an electric cylinder 20, and a phenotype detection module 21.

The small arm 16 includes a first link 16-1, a second link 16-2 and an electric cylinder 20. The first link 16-1 and the second link 16-2 are parallel link mechanisms. The electrical cylinder 20 is configured to adjust the level of the cutter 18 to enable the cutter 18 to be adapted to the fluctuation of the soil surface. One end of the electric cylinder 20 is hinged to the first link 16-1, and the other end is hinged to the second link 16-2, so that the cutter 18 is driven by the electric cylinder 20 to float up and down along with the four-link mechanism.

A linear displacement sensor is installed on the guide rail 14, and each of the first rotary joint 11, the second rotary joint 19, the first motor 10, the second motor 13, the third motor 15, and the fourth motor 17 has an angle sensor mounted thereon. The phenotype detection module 21 is composed of a multi-line lidar, an IMU, and a camera. The phenotype detection module 21 can store the detected field plants and ground information in a second industrial computer located on the robot.

The weeding robotic arm 4 of the weeding robot further includes a controller, which collects feedback data from sensors on the weeding robotic arm, controls the motion of all motors and electric cylinders on the weeding robotic arm, and drives the cutter 18 at the end of the weeding robotic arm to move according to a planned trajectory.

The control flow is as follows.

In step 1, after the weeding robot goes into the field, the angle of the first motor 10 is adjusted, the big arm 12 is rotated, and it is detected whether the second rotary joint 19 is between the two rows of crops; in a step 2, the second motor 13 is adjusted to reduce the level of the cutter 18; in a step 3, the weeding robot is started to walk, and the fourth motor 17 is started to rotate; in a step 4, the robotic arm controller accepts a planned trajectory; in a step 5, coordinate transformation is performed, to transform the weed path into a swing target trajectory of the second rotary joint 19; in a step 6, a position deviation between an actual angle of the second rotary joint 19 and the target trajectory point of the second rotary joint 19 is calculated; in a step 7, the deviation is used as an input of the proportion integral differential (PID) control algorithm, and a control instruction value of the third motor 15 is calculated; in a step 8, the controller outputs an instruction signal, and the third motor 15 drives the small arm 16 of the weeding robotic arm 4 to swing between the two rows of crops; in a step 9, the swing trajectory follows the planned path; in a step 10, the angle sensor at the second rotary joint 19 of the small arm 16 feeds back the swing angle of the small arm 16 in real time; in a step 11, when the phenotype detection module 21 detects that the ground elevation fluctuates, the controller sends an instruction to the electric cylinder 20 to adjust the displacement of the electric cylinder 20 to drive the cutter 18 to float up and down along with the link mechanism to avoid damage to the cutter 18 and the drive motor of the cutter 18.

When the second camera is a binocular camera, and a 3D scene graph is constructed in the second embodiment, a global navigation satellite system (GNSS) satellite positioning receiver is installed on the weeding robot, and the position of the weeding robot in the geodetic coordinate system is known. Since the installation position of the second camera on the robot is known, the 3D scene modeling uses the satellite positioning information from the GNSS receiver. The 3D spatial models of crops and weeds are based on the geodetic coordinate system, and according to the structure of the weeding robotic arm 4, the 3D structure of crops and weeds can all be converted to the coordinate system of the second rotary joint 19 of the weeding robotic arm 4. An angle feedback sensor is installed at the second rotary joint 19, so the position of the cutter 18 under the coordinate system is known so that the position of the cutter 18 and the position of the weeds and crops are unified in the same coordinate system.

Figure 5:
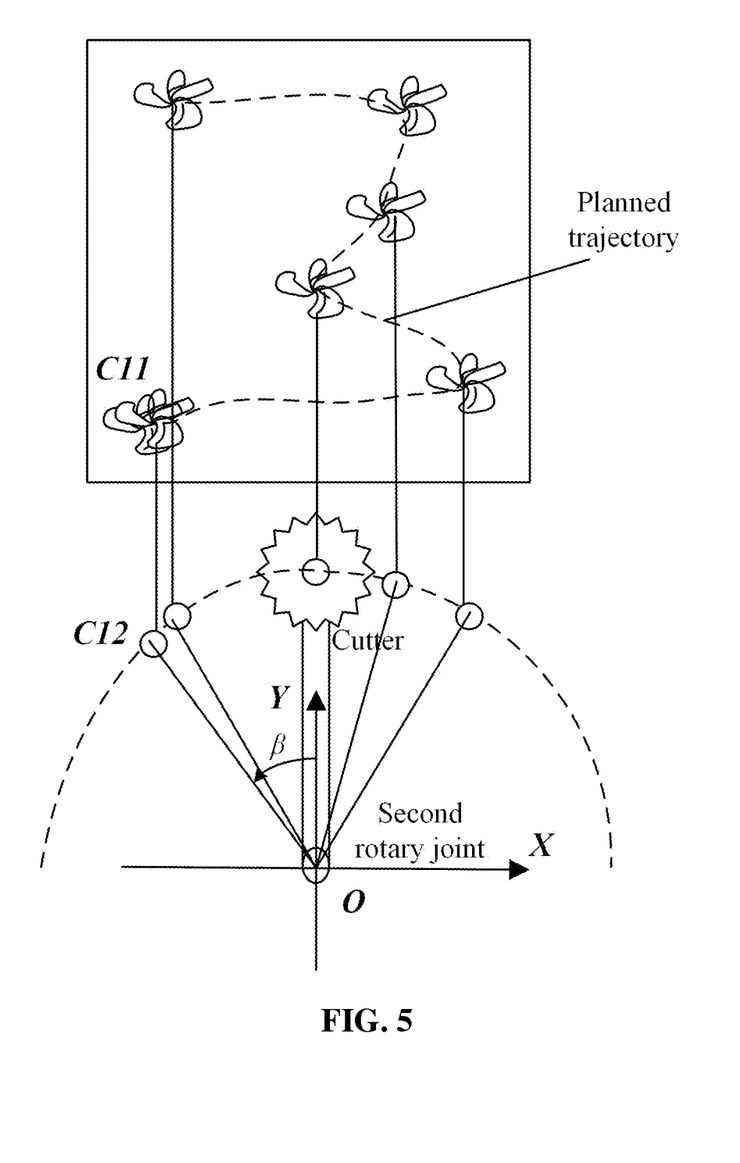
FIG. 5 is a planning diagram of a weeding path for a weeding robot according to an embodiment of the present application.

As shown in FIG. 5, the planned path is transformed into the swing target trajectory of the small arm 16 in step 5, and the method for the conversion is as follows.

The driving speed v of the weeding robot is measured in real time by the GNSS receiver, the position of the weed C11 in the coordinate system of the second rotary joint 19 is (x11, y11), and when to remove the weed C11, the rotation angle $\beta$ of the small arm 16 is $\beta=\arcsin(x11/R)$; R represents the length of the small arm 16; and the projection distance L from the weed C11 to the motion arc of the small arm 16 is $L=y11-R\cos\beta$; then the arrival time interval $t1=L/v$ can be calculated; the current moment is set to be t, the moment when the small arm of the weeding robotic arm 4 rotates to the position $\beta$ is $t+t1$; by analogy, the swing target trajectory (swing angle and time history curve) of the small arm 16 is calculated; then the position deviation between the actual angle of the second rotary joint 19 and the target trajectory point of the second rotary joint 19 is calculated; the deviation is used as an input of the PID control algorithm to calculate a motor control instruction value; and the controller outputs an instruction signal, and the third motor 15 drives the small arm 16 of the weeding robotic arm 4 to swing between the two rows of crops. In FIG. 5, C12 is the projection of the weed C11 on the motion arc of the small arm 16, and the Y-axis direction represents the heading direction of the weeding robot.

After the image of the N-th camera is matched with the feature of the (N−1)-th camera, the small arm 16 of the weeding robotic arm 4 performs an action according to the swing target trajectory of the small arm after the coordinate transformation.

Based on this, by fusing the data of the 3D space perception sensor (a binocular camera, a depth camera or a multi-line lidar sensor), the IMU, and the GNSS receiver, the reconstructed 3D scene significantly improves precision of perception of the robot system to weeds.

In the inter-camera weed tracking system in the embodiment of the present application, the image captured by the first camera is firstly segmented by using the deep neural network model, and the accurate weed segmentation result in the front view of the robot is obtained, and next, correlation of position information (position coordinates and transformation matrix between the positions of the multiple cameras are known) between the multiple cameras and the visual odometry method based on the multiple sensors (the IMU, the binocular camera, and the GNSS receiver) are utilized to obtain the 3D spatial position information of the weeds, to accurately construct the 3D scene structure of crops/weeds/soil, and then the 2D image segmentation results are matched with the 3D scene graph, to extend the detection result of the first camera to the inter-camera detection method, and an image template including the position of a main stem of a crop is determined, and the template is kept updated. Based on the coordinates of the stem of the weed in the image template, the weeding motion trajectory is planned with the goal of minimizing energy consumption of the robotic arm. Thereby, weeding precision is improved. The 3D scene graph may be a 3D scene point cloud graph.

In the inter-camera tracking system, the tracked target may be one weed or multiple weeds, which is not limited in this application.

Figure 6:
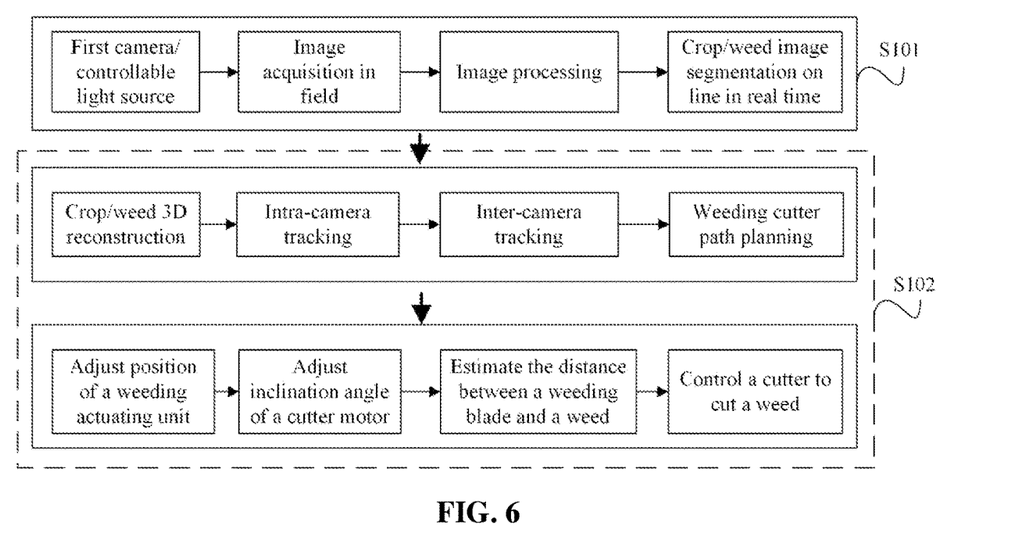
FIG. 6 is a flowchart of another method for planning a weeding path for a weeding robot according to an embodiment of the present application.

As shown in FIG. 6, in this embodiment, the control algorithm is as follows: the first camera and a controllable light source are activated, field images are captured, image processing is performed, and the images of crops and weeds are segmented online in real time. 3D reconstruction of the crops and weeds is performed, intra-camera tracking and inter-camera tracking are used, the algorithm is controlled to predict a trigger time and a cutter position, an azimuth angle of the weeding robotic arm is adjusted, an inclination angle of a weeding motor is adjusted, and the distance between the weeding blade and the weed is estimated, and the cutter is triggered to cut the weed. The weeding actuating unit is a weeding robotic arm 4, and the weeding motor is the fourth motor 17.

According to an embodiment of the present application, the method for planning a weeding path for a weeding robot further includes as follows.

Based on neural network model training, a lightweight target detector is obtained. After each acquisition of a weed target feature and a weed label of the acquired weed target feature, the lightweight target detector is used to reprocess the image captured by each camera, to verify whether the acquired weed target feature and the weed label of the acquired weed target feature are correct.

Compared with the image segmentation model, the lightweight object detector runs faster and processes images faster (the lightweight object detector here is different from the aforementioned lightweight object detector), and further, after the first camera captures an image, and the image is segmented and identified by the image segmentation model, it can also be verified by the lightweight target detector. If the processing result of the image segmentation model is consistent with the detection result of the lightweight target detector, it means that the processing result of the image segmentation model is correct, and the result can be sent to the next camera as a classification standard, and then the weeding robotic arm is controlled to weed. If the processing result of the image segmentation model is inconsistent with the detection result of the lightweight target detector, then it means the processing result of the image segmentation model is inaccurate and needs to be shut down for maintenance, to prevent crops from being damaged due to misclassification.

According to an embodiment of the present application, a camera is provided at the rear of the weeding robot; after the weeding path for the weeding robotic arm of the weeding robot is corrected according to the N-th weed target feature and the weed label of the N-th weed target feature, the method for planning a weeding path for a weeding robot further includes: controlling the weeding robotic arm of the weeding robot to weed according to the weeding path; acquiring an image after weeding through the camera arranged at the rear of the weeding robot, and comparing it with the first image and analyzing to establish an evaluation function: $S=[n2/(2 \times n1) \times e^{\wedge}(-m1/(m1+n1))+(m1-m2)/(2 \times m1) \times (1-e^{\wedge}(-m1/(m1+n1)))] \times 100$, where, the total number of weeds in the first image is n1, and the total number of crops in the first image is m1, and according to the first image and the image after the weeding, the number of successfully removed weeds acquired is n2, and the number of accidentally injured crops acquired is m2; and control parameters of a yaw driving motor of the weeding robotic arm are adjusted according to the value of the evaluation function S.

The camera is installed on the rear of the weeding robot. According to the value of the evaluation function S, the quality of weeding can be known. When the value of the evaluation function S is larger, it means the quality of the weeding is better, and the value of the evaluation function S is smaller, the operation effect of the weeding is not ideal, and the driving speed of the robot needs to be reduced, and moreover, the control parameters of the motor in the weeding robotic arm are adjusted to improve the response speed.

According to an embodiment of the present application, the weed target feature includes one or a combination of several of weed contour, color, shape, texture, and position; the crop target feature includes one or a combination of several of crop contour, color, shape, texture, and position; and the soil target feature includes one or a combination of several of soil contour, color, shape, texture, and position.

With the image segmentation model, the soil target feature and the crop target feature can also be identified; the level of the weeding robotic arm can be adjusted according to the soil target feature; and the evaluation function S can be finally established according to the crop target feature.

Figure 7:
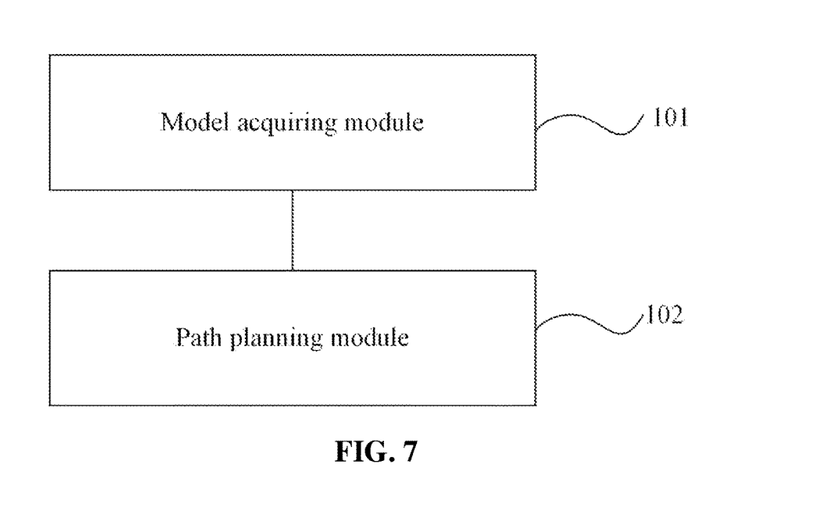
FIG. 7 is a schematic block diagram of an apparatus for planning a weeding path for a weeding robot according to an embodiment of the present application.

FIG. 7 is a schematic block diagram of an apparatus for planning a weeding path for a weeding robot according to an embodiment of the present application. The apparatus is applied to the method for planning a weeding path for the weeding robot as described above, and as shown in FIG. 7, the apparatus includes: a model acquisition module 101 and a path planning module 102.

The model acquisition module 101 is configured to acquire an image segmentation model based on neural network model training, and the image segmentation model is configured to identify and segment a weed target feature, a soil target feature and a crop target feature; the path planning module 102 is configured to, based on the weed target feature, acquire the weed target feature by intra-camera tracking and acquire the weed target feature by inter-camera tracking, and plan a weeding path for a weeding robotic arm of a weeding robot, to enable the robotic arm to weed according to the weeding path.

According to an embodiment of the present application, a first camera, . . . , an i-th camera, . . . , an N-th camera are arranged sequentially at intervals in an opposite direction of a heading direction of the weeding robot, and the first camera to the N-th camera move with a movement of the weeding robot; the path planning module 102 includes: a first weed target feature extracting module configured to acquire a first image captured by the first camera, invoke the image segmentation model to identify and segment the first image, to generate a first weed target feature and a weed label of the first weed target feature; a second weed target feature extracting module configured to, when the i-th camera is a second camera, acquire an i-th image captured by the i-th camera, extract target feature in the i-th image according to the density-based spatial clustering method, and match the target feature in the i-th image with an (i−1)-th weed target feature, to obtain an i-th weed target feature corresponding to the (i−1)-th weed target feature and a weed label of the i-th weed target feature; a first path planning module configured to, according to the i-th weed target feature and the weed label of the i-th weed target feature, plan a weeding path for the weeding robotic arm of the weeding robot; a third weed target feature extracting module configured to, when the i-th camera is a third camera to the Nth camera in sequence, extract target feature in the i-th image according to the density-based spatial clustering method, match the target feature in the i-th image with an (i−1)-th weed target feature to obtain an i-th weed target feature corresponding to the (i−1)-th weed target feature, and a weed label of the i-th weed target feature; a second path planning module configured to, according to the i-th weed target feature and the weed label of the i-th weed target feature, correct the weeding path for the weeding robotic arm of the weeding robot; where, N≥2, 1<i≤N, i and N are both positive integers; the time for the N-th camera to follow the weeding robot to move to an original position of the first camera and the sum of time of image processing of the first camera to the N-th camera are greater than or equal to the time for the weeding robotic arm of the weeding robot to swing to the position of a weed corresponding to the first weed target feature.

According to an embodiment of the present application, a first camera, . . . , a j-th camera, . . . , an N-th camera are arranged sequentially at intervals in an opposite direction of a heading direction of the weeding robot, and the first camera to the N-th camera move with a movement of the weeding robot; the path planning module 102 includes: a first weed target feature extracting module configured to acquire a first image captured by the first camera, invoke an image segmentation model to identify and segment the first image, to generate a first weed target feature and a weed label of the first weed target feature; a 3D scene graph acquisition module configured to, when the j-th camera is a second camera, acquire a j-th image captured by the j-th camera, and reconstruct a 3D scene graph of weeds by the j-th camera according to the j-th image, where the j-th camera is any one of a binocular camera, depth camera or multi-line lidar sensor; an image template forming module configured to match a (j−1)-th weed target feature and a weed label of the (j−1)-th weed target feature with a weed in the 3D scene graph, and separate a 3D graph of a weed from a matching result, and extract position coordinates of a main stem of a crop, to form an image template according to the 3D graph and the position coordinates; a (j+1)-th weed target feature extracting module configured to acquire a (j+1)-th image captured by a (j+1)-th camera, extract target feature in the (j+1)-th image according to the density-based spatial clustering method, and match the target feature in the (j+1)-th image with the image template, to obtain an (j+1)-th weed target feature and a weed label of the (j+1)-th weed target feature; a (j+1)-th path planning module configured to plan a weeding path for the weeding robotic arm of the weeding robot according to the (j+1)-th weed target feature and the weed label of the (j+1)-th weed target feature; the 3D scene graph acquisition module, further configured to, when the j-th camera is a third camera to the (N−1)-th camera in sequence, acquire a j-th image captured by the j-th camera, and reconstruct a 3D scene graph of weeds through the j-th camera according to the j-th image, where the j-th camera is one of a binocular camera, a depth camera or a multi-line lidar sensor; the image template forming module, further configured to match a (j−1)-th weed target feature and a weed label of the (j−1)-th weed target feature with weeds in the 3D scene graph, separate a 3D graph of a weed from a matching result, and extract position coordinates of a main stem of a crop to form an image template according to the 3D graph and the position coordinates; the (j+1)-th weed target feature extracting module, further configured to acquire a (j+1)-th image captured by a (j+1)-th camera, extract target feature in the (j+1)-th image according to the density-based spatial clustering method, match the target feature in the (j+1)-th image with the image template to obtain an (j+1)-th weed target feature and a weed label of the (j+1)-th weed target feature; the (j+1)-th path planning module, further configured to, according to the (j+1)-th weed target feature and the weed label of the (j+1)-th weed target feature, correct the weeding path for the weeding robotic arm of the weeding robot; an N-th weed target feature extracting module configured to, when the j-th camera is the N-th camera, acquire a j-th image captured by the N-th camera, extract target feature in the j-th image according to the density-based spatial clustering method, and match the target feature in the j-th image with a (j−1)-th weed target feature, to obtain a j-th weed target feature corresponding to the (j−1)-th weed target feature and a weed label of the j-th weed target feature; an N-th path planning module configured to correct the weeding path for the weeding robotic arm of the weeding robot according to the j-th weed target feature and the weed label of the j-th weed target feature; where, N≥2, 1<i≤N, where j and N are both positive integers; the time for the N-th camera to follow the weeding robot to move to an original position of the first camera and the sum of time of image processing of the first camera to the N-th camera are greater than or equal to the time for the weeding robotic arm of the weeding robot to swing to the position of a weed corresponding to the first weed target feature.

According to an embodiment of the present application, the apparatus for planning a weeding path for a weeding robot further includes: a target detector acquisition module, configured to obtain a lightweight target detector based on neural network model training; a verification module, configured to, after each acquisition of a weed target feature and a weed label of the acquired weed target feature, reprocess the image captured by each camera, to verify whether the acquired weed target feature and the weed label of the acquired weed target feature are correct.

According to an embodiment of the present application, the camera provided at the rear of the weeding robot further includes: a control module configured to control the weeding robotic arm of the weeding robot to weed according to a weeding path; an evaluation module configured to acquire an image after weeding through the camera arranged at the rear of the weeding robot, and compare it with the first image and analyze to establish an evaluation function: $S=[n2/(2\times n1)\times e^{\hat{}}(-m1/(m1+n1))+(m1-m2)/(2\times m1)\times(1-e^{\hat{}}(-m1/(m1+n1)))]\times 100$, where, the total number of weeds in the first image is n1, and the total number of crops in the first image is m1, and according to the first image and the image after weeding, the number of successfully removed weeds acquired is n2, and the number of accidentally injured crops acquired is m2; and control parameters of a yaw driving motor of the weeding robotic arm are adjusted according to the value of the evaluation function S.

According to an embodiment of the present application, the model acquisition module 101 includes: an acquisition module configured to acquire multiple original images through a camera under different parameters, where the different parameters include the growth stage of crops, light intensity, temperature, humidity, soil type and acquisition time; a labeled image generation module, configured to classify multiple original images according to the growth stage of crops, and label crops, weeds and soil in each original image to form labeled images; a classification module, configured to randomly split the original images and corresponding labeled images of each growth stage of the crops into training set, validation set and test set; a training module, configured to define a deep neural network architecture, and based on the training set, validation set and test set of each growth stage of the crops, set training parameters, and invoke an optimization algorithm to train the deep neural network architecture, and obtain the model weight file after training; and acquire an image segmentation model of each growth stage of the crops based on the model weight file.

The above product can perform the method according to any embodiment of the present application, and has corresponding functional modules for performing the method and effects corresponding to those achieved by performing the method.

Figure 8:
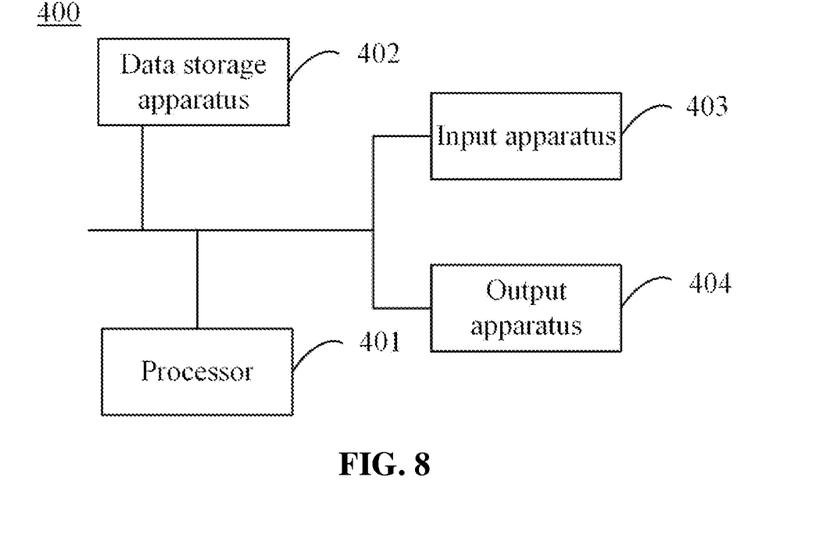
FIG. 8 is a structural block diagram of a weeding robot according to an embodiment of the present application.

FIG. 8 is a structural block diagram of a weeding robot according to an embodiment of the present application. As shown in FIG. 8, the weeding robot 400 includes the apparatus for planning a weeding path for the weeding robot as described before; it further includes: one or more processors 401; a data storage apparatus 402, configured to store one or more programs, and store images captured by each camera, image templates, and corresponding coordinate information in the 3D scene graph; one or more programs, when being executed by one or more processors 401, cause the one or more processors 401 to implement the weeding robot and the method for planning a weeding path for the weeding robot as described above.

As shown in FIG. 8, the weeding robot 400 includes a processor 401, a data storage apparatus 402, an input apparatus 403 and an output apparatus 404; the number of the processors 401 in the device may be one or more, and one processor 401 is taken as an example in FIG. 8. The processor 401, the data storage apparatus 402, the input apparatus 403 and the output apparatus 404 in the device may be connected through a bus or other means, and the connection through a bus is taken as an example in FIG. 8.

As a computer-readable storage medium, the data storage apparatus 402 can be configured to store software programs, computer-executable programs and modules, such as program instructions corresponding to the weeding robot and the method for planning a weeding path for the weeding robot in the embodiments of the present application. The processor 401 executes various functional applications of the device and data processing by running the software programs, instructions and modules stored in the data storage apparatus 402, thus implementing the weeding robot and the method for planning a wedding path for the weeding robot described above.

The data storage apparatus 402 may mainly include a program storage area and a data storage area, where the program storage area may store an operating system, an application program required by at least one function; the data storage area may store data created according to the use of the terminal, and the like. Additionally, the data storage apparatus 402 may include a high-speed random access memory, and may further include a non-volatile memory, such as at least one magnetic disk storage apparatus, flash memory apparatus, or other non-volatile solid state storage apparatus. In some examples, the data storage apparatus 402 may include memories located remotely from processor 401, those memories may be connected to the device through a network. Examples of such a network include, but are not limited to, the internet, an enterprise intranet, a local area network, a mobile communication network, and combinations thereof.

The input apparatus 403 may be configured to receive incoming instruction requests, and to generate key signal inputs related to settings and function controls of the device. The output apparatus 404 may include a display device such as a display screen.

According to an embodiment of the present application, the weeding robot further includes: at least one controller configured to collect feedback data from sensors on the weeding robotic arm, control the movements of all motors and electric cylinders on the weeding robotic arm, and drive the cutter at the end of the weeding robotic arm to move according to a planned trajectory; at least one group of weeding execution apparatuses, where the weeding execution apparatus includes a link mechanism, a motor with angle feedback and an electric cylinder with position feedback.

A computer-readable storage medium on which one or more computer programs are stored is further provided according to embodiments of the present application. The one or more computer programs, when being executed by the processor 401, cause the processor 401 to implement the weeding robot and the method for planning a weeding path for the weeding robot described above.

That is to say, the storage medium containing computer-executable instructions is provided in the embodiments of the present application, the computer-executable instructions of which can execute the relevant operations in the weeding robot and the method for planning a weeding path for the weeding robot according to any embodiment of the present application.

From the above description of the embodiments, those skilled in the art can clearly understand that the present application can be implemented by means of software and necessary general-purpose hardware, and can also be implemented by hardware. The technical solution of the present application can essentially be embodied in the form of a software product, and the computer software product can be stored in a computer-readable storage medium, such as a floppy disk, a read-only memory (ROM), a random access memory (RAM), a flash memory (FLASH), a hard disk or an optical disk, etc., of a computer, including multiple instructions to enable a computer device (which may be a personal computer, a server, or a network device, etc.) to perform the method according to the embodiments of the present application.

In summary, according to the weeding robot and the method and apparatus for planning a weeding path for the weeding robot and the medium proposed in the embodiments of the present application, an image segmentation model is acquired based on neural network model training, and the image segmentation model is configured to identify and segment a weed target feature, a soil target feature, and a crop target feature; based on the image segmentation model, a weeding path for the weeding robotic arm of the weeding robot is planned by the method of intra-camera tracking and the method of inter-camera tracking, so as to reliably record and trace the position of weeds based on the intra-camera tracking and the inter-camera tracking, to mitigate the harmful effects of image processing delays and improve precision of weeding.

What is claimed is:

1. A method for planning a weeding path for a weeding robot, comprising:
    acquiring an image segmentation model based on neural network model training, wherein the image segmentation model is configured to identify and segment a weed target feature, a soil target feature and a crop target feature; and
    based on the weed target feature, acquiring the weed target feature by intra-camera tracking, and acquiring the weed target feature by inter-camera tracking, and planning a weeding path for a weeding robotic arm of the weeding robot, to enable the weeding robotic arm to weed according to the weeding path,
    wherein a first camera, ..., an i-th camera, ..., an N-th camera are arranged sequentially at intervals in an opposite direction of a heading direction of the weeding robot, and the first camera to the N-th camera move with a movement of the weeding robot;
wherein based on the weed target feature, acquiring the weed target feature by intra-camera tracking, and acquiring the weed target feature by inter-camera tracking, and planning a weeding path for a weeding robotic arm of the weeding robot, comprises:
    acquiring a first image captured by the first camera, identifying and segmenting the first image by the image segmentation model, to generate a first weed target feature and a weed label of the first weed target feature;
    when the i-th camera is a second camera, acquiring an i-th image captured by the i-th camera, extracting a target feature in the i-th image according to a density-based spatial clustering method, and matching the target feature in the i-th image with an (i−1)-th weed target feature, to obtain an i-th weed target feature corresponding to the (i−1)-th weed target feature and a weed label of the i-th weed target feature; according to the i-th weed target feature and the weed label of the i-th weed target feature, planning the weeding path for the weeding robotic arm of the weeding robot;
    when the i-th camera is a third camera to the N-th camera in sequence, extracting target feature in the i-th image according to the density-based spatial clustering method, matching the target feature in the i-th image with an (i−1)-th weed target feature to obtain an i-th weed target feature corresponding to the (i−1)-th weed target feature, and a weed label of the i-th weed target feature; according to the i-th weed target feature and the weed label of the i-th weed target feature, correcting the weeding path for the weeding robotic arm of the weeding robot;
wherein, N≥2, 1<i≤N, i and N are both positive integers; time for the N-th camera to move with the weeding robot to an original position of the first camera and a sum of time for image processing of the first camera to the N-th camera are greater than or equal to time for the weeding robotic arm of the weeding robot to swing to a position of a weed corresponding to the first weed target feature.

2. The method for planning a weeding path for a weeding robot according to claim 1, wherein a first camera, ..., a j-th camera, ..., an N-th camera are arranged sequentially at intervals in an opposite direction of a heading direction of the weeding robot, and the first camera to the N-th camera move with a movement of the weeding robot;
    the based on the weed target feature, acquiring the weed target feature by intra-camera tracking and acquiring the weed target feature by inter-camera tracking, and planning a weeding path for a weeding robotic arm of the weeding robot comprises:
        acquiring a first image captured by the first camera, invoking the image segmentation model to identify and segment the first image, to generate a first weed target feature and a weed label of the first weed target feature;
        when the j-th camera is a second camera, acquiring a j-th image captured by the j-th camera, and reconstructing a 3D scene graph of weeds by the j-th camera according to the j-th image, wherein the j-th camera is one of a binocular camera, depth camera or multi-line lidar sensor; matching a (j−1)-th weed target feature and a weed label of the (j−1)-th weed target feature with a weed in the 3D scene graph, and separating a 3D graph of the weed from a matching result, and extracting position coordinates of a main stem of a crop, to form an image template according to the 3D graph and the position coordinates; acquiring a (j+1)-th image captured by a (j+1)-th camera, extracting target feature in the (j+1)-th image according to a density-based spatial clustering method, and matching the target feature in the (j+1)-th image with the image template, to obtain an (j+1)-th weed target feature and a weed label of the (j+1)-th weed target feature; planning a weeding path for the weeding robotic arm of the weeding robot according to the (j+1)-th weed target feature and the weed label of the (j+1)-th weed target feature;
        when the j-th camera is a third camera to the (N−1)-th camera in sequence, acquiring a j-th image captured by the j-th camera, and reconstructing a 3D scene graph of weeds through the j-th camera according to the j-th image, wherein the j-th camera is one of a binocular camera, a depth camera or a multi-line lidar sensor; matching a (j−1)-th weed target feature and a weed label of the (j−1)-th weed target feature with weeds in the 3D scene graph, separating a 3D graph of a weed from a matching result, and extracting position coordinates of a main stem of a crop to form an image template according to the 3D graph and the position coordinates; acquiring a (j+1)-th image captured by a (j+1)-th camera, extracting target feature in the (j+1)-th image according to the density-based spatial clustering method, matching the target feature in the (j+1)-th image with the image template to obtain an (j+1)-th weed target feature and a weed label of the (j+1)-th weed target feature; according to the (j+1)-th weed target feature and the weed label of the (j+1)-th weed target feature, correcting the weeding path for the weeding robotic arm of the weeding robot;

when the j-th camera is the N-th camera, acquiring a j-th image captured by the N-th camera, extracting target feature in the j-th image according to the density-based spatial clustering method, and matching the target feature in the j-th image with a (j−1)-th weed target feature, to obtain a j-th weed target feature corresponding to the (j−1)-th weed target feature and a weed label of the j-th weed target feature; correcting the weeding path for the weeding robotic arm of the weeding robot according to the j-th weed target feature and the weed label of the j-th weed target feature;

wherein, N≥2, 1<i≤N, i and N are both positive integers; time for the N-th camera to move with the weeding robot to an original position of the first camera and a sum of time for image processing of the first camera to the N-th camera are greater than or equal to time for the weeding robotic arm of the weeding robot to swing to a position of a weed corresponding to the first weed target feature.

3. The method for planning a weeding path for a weeding robot according to claim 1, further comprising:
acquiring a lightweight object detector based on a supervised neural network training method; and
after each acquisition of the weed target feature and the weed label of the acquired weed target feature, reprocessing images captured by each camera by the lightweight object detector to verify whether the acquired weed target feature and the weed label of the acquired weed target feature are correct.

4. The method for planning a weeding path for a weeding robot according to claim 1, wherein a camera is arranged at a rear of the weeding robot;
wherein after correcting the weeding path for the weeding robotic arm of the weeding robot according to the N-th weed target feature and the weed label of the N-th weed target feature, the method further comprises:
controlling the weeding robotic arm of the weeding robot to weed according to the weeding path;
acquiring an image after weeding through the camera arranged at the rear of the weeding robot, and comparing and analyzing the image after weeding with the first image to establish an evaluation function: $S=[n2/(2\times n1)\times e^{\wedge}(-m1/(m1+n1))+(m1-m2)/(2\times m1)\times(1-e^{\wedge}(-m1/(m1+n1)))]\times 100$, wherein a total number of weeds in the first image is n1, a total number of crops in the first image is m1, a number of successfully removed weeds acquired according to the first image and the image after weeding is n2, and a number of accidentally injured crops acquired according to the first image and the image after weeding is m2; and
adjusting control parameters of a driving motor of the weeding robotic arm according to a value of the evaluation function S.

5. The method for planning a weeding path for a weeding robot according to claim 1, wherein the acquiring an image segmentation model based on neural network model training comprises:
capturing a plurality of original images through a camera under different parameters, wherein the different parameters comprise growth stages of crops, light intensity, temperature, humidity, soil type and capturing time;
classifying the plurality of original images according to the growth stages of the crops, and labeling the crops, weeds, and soil in each original image to form labeled images;
dividing the original images and the labeled images of each growth stage of the crops into a training set, a validation set, and a test set;
defining a deep neural network architecture, and based on each of the training set, the validation set and the test set of each growth stage of the crops, setting training parameters, and training the deep neural network architecture with an optimization algorithm to obtain a model weight file after training; and
acquiring an image segmentation model of each growth stage of the crops based on the model weight file.

6. The method for planning a weeding path for a weeding robot according to claim 1, wherein:
the weed target feature comprises at least one combination of a weed contour, a weed color, a weed shape, a weed texture, or a weed position;
the crop target feature comprises at least one combination of a crop contour, a crop color, a crop shape, a crop texture, or a crop position; and
the soil target feature comprises at least one combination of a soil contour, a soil color, a soil shape, a soil texture, or a soil position.

7. A weeding robot, comprising
at least one processor;
a data storage apparatus, configured to store at least one program, and store images captured by each camera, image templates and corresponding coordinate information in a 3D scene graph;
wherein the at least one program, when being executed by the at least one processor, causes the at least one processor to implement:
acquiring an image segmentation model based on neural network model training, wherein the image segmentation model is configured to identify and segment a weed target feature, a soil target feature and a crop target feature; and
based on the weed target feature, acquiring the weed target feature by intra-camera tracking, and acquiring the weed target feature by inter-camera tracking, and planning a weeding path for a weeding robotic arm of the weeding robot, to enable the weeding robotic arm to weed according to the weeding path,
wherein a first camera, . . . , an i-th camera, . . . an N-th camera are arranged sequentially at intervals in an opposite direction of a heading direction of the weeding robot, and the first camera to the N-th camera move with a movement of the weeding robot;
wherein based on the weed target feature, acquiring the weed target feature by intra-camera tracking, and acquiring the weed target feature by inter-camera tracking, and planning a weeding path for a weeding robotic arm of the weeding robot, comprises:
acquiring a first image captured by the first camera, identifying and segmenting the first image by the image segmentation model, to generate a first weed target feature and a weed label of the first weed target feature;
when the i-th camera is a second camera, acquiring an i-th image captured by the i-th camera, extracting a target feature in the i-th image according to a density-based spatial clustering method, and matching the target feature in the i-th image with an (i−1)-th weed target feature, to obtain an i-th weed target feature corresponding to the (i−1)-th weed target feature and a weed label of the i-th weed target feature; according to the i-th weed target feature and the weed label of the i-th weed target feature, planning the weeding path for the weeding robotic arm of the weeding robot;

when the i-th camera is a third camera to the N-th camera in sequence, extracting target feature in the i-th image according to the density-based spatial clustering method, matching the target feature in the i-th image with an (i−1)-th weed target feature to obtain an i-th weed target feature corresponding to the (i−1)-th weed target feature, and a weed label of the i-th weed target feature; according to the i-th weed target feature and the weed label of the i-th weed target feature, correcting the weeding path for the weeding robotic arm of the weeding robot;

wherein, $N \geq 2$, $1 < j \leq N$, i and N are both positive integers; time for the N-th camera to move with the weeding robot to an original position of the first camera and a sum of time for image processing of the first camera to the N-th camera are greater than or equal to time for the weeding robotic arm of the weeding robot to swing to a position of a weed corresponding to the first weed target feature.

8. A non-transitory computer-readable storage medium storing a computer program, wherein the computer program, when being executed by a processor, causes the processor to implement the method for planning a weeding path for a weeding robot according to claim 1.

* * * * *